(No Model.)
J. F. FERRIS & W. M. THOMAS.
GATE.
No. 523,202. Patented July 17, 1894.
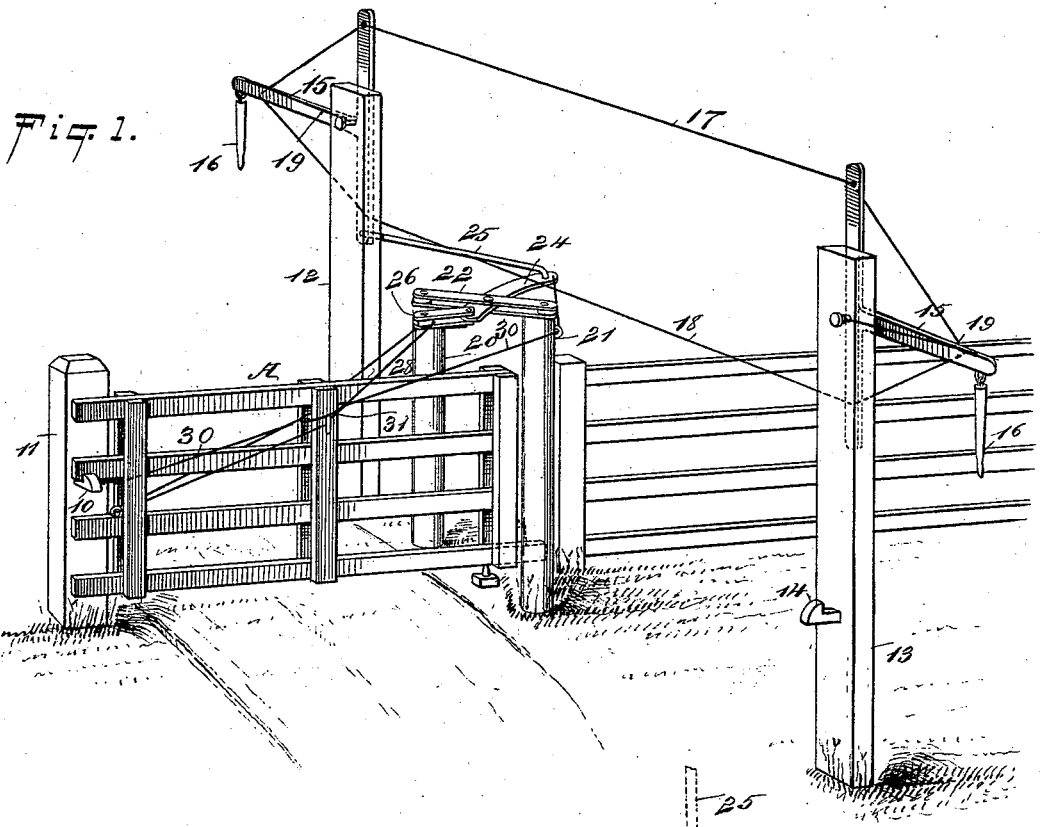
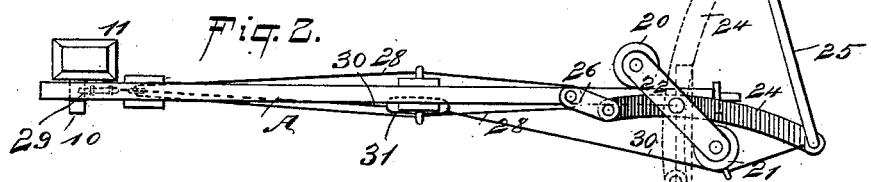
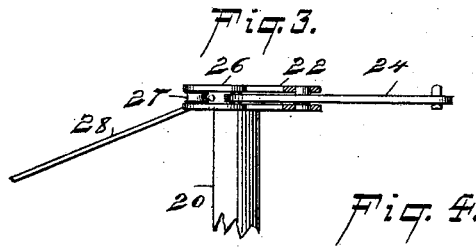
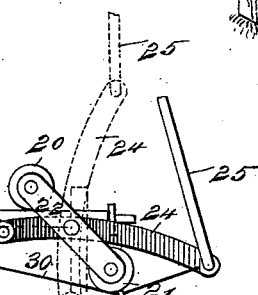
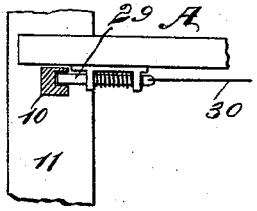
WITNESSES:
William Goebel.
C. Sedgwick
INVENTORS.
J. F. Ferris
W. M. Thomas
By Munn & Co
ATTORNEYS.

UNITED STATES PATENT OFFICE.

JOHN F. FERRIS AND WARREN M. THOMAS, OF NORTH ENGLISH, IOWA.

GATE.

SPECIFICATION forming part of Letters Patent No. 523,202, dated July 17, 1894.

Application filed March 29, 1894. Serial No. 505,597. (No model.)

*To all whom it may concern:*

Be it known that we, JOHN F. FERRIS and WARREN M. THOMAS, of North English, in the county of Iowa and State of Iowa, have invented a new and useful Improvement in Gates, of which the following is a full, clear, and exact description.

Our invention relates to an improvement in gates, and especially to an improvement in farm gates, or gates adapted to be located across a road.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a perspective view of the improved gate. Fig. 2 is a plan view thereof. Fig. 3 is a detail view partly in section of a portion of the operating mechanism of the gate; and Fig. 4 is a detail view of the lock.

The gate A may be of any approved construction, and at one end it is adapted to engage with a keeper 10 located upon a post 11 or other support in the line of the partition or fence of which it constitutes a part. The gate is pivoted to a block or other support at the lower portion of its opposite end only, the upper portion of said end being without any support, whereby the tendency of the gate is to sag in direction of its free end, and therefore the weight of the gate will be sustained by the keeper with which it may engage, thus rendering it exceedingly difficult for an animal to open the gate and especially to swing it upon its pivot.

At opposite sides of the partition or fence of which the gate forms a part or continuation, posts 12 and 13 are located, and one of said posts is provided with a keeper 14, adapted for engagement with the gate when the latter is open. Each of these posts has pivoted near its upper end a lever 15, adapted for use in opening the gate. These levers are preferably T-levers, and are pivoted to the posts at about the central portion of their heads, or where the several members join, whereby in one position two of the members will be in a vertical position and one in a horizontal position. This is the normal position of the levers, and their horizontal members are usually provided with a handle 16, bringing the lever within reach of a person walking or riding. The upper ends of the upper vertical members of both levers are connected by a link or chain 17. This link or chain passes through the upper ends of the upper vertical member of the levers, out to a point near the ends of the horizontal members where an attachment is effected. The levers are further connected by a lower chain or link 18 extending from one lower vertical member to the other, through said members and to an attachment with the horizontal members where the ends of the upper link are secured. In this manner a complete connection is made between the levers, acting to brace the horizontal members when they are pulled down or pushed up in operating the gate. The horizontal or handle members of the levers may be further braced by rods 19 connected with them near their outer ends and ordinarily connected with the pivot pins of the levers themselves.

In addition to the posts 12 and 13 carrying the opening levers 15, two other posts 20 and 21 are located one at each side of the gate at its pivot point. These posts are located diagonally opposite each other, one of them being nearer the rear end of the gate than the other. The two posts 20 and 21, are connected by spaced plates 22, and about centrally between these plates a curved arm or lever 24 is pivoted, the pivot point of the lever being nearer its forward than its rear end, whereby the said arm or lever extends a greater distance from its support in direction of the rear than forwardly of the rear end of the gate. The rear end of the curved lever 24, is connected with the lower member of one of the manipulating or handle levers 15, through the medium of a link 25, and by reason of the connections 17 and 18 between the two handle or manipulating levers the curved lever 24, which is really the swinging lever of the gate, may be operated equally well by the manipulation of either hand lever.

A loop 26, constructed of metal or other approved material, is horizontally located and pivotally attached to the forward or shorter end of the swing lever 24, said loop 26, being provided at its forward end, as shown in Fig.

3, with a friction roller 27; and a chain, wire or cable 28, or the equivalent thereof, is passed around the said friction roller 27 down through guides at opposite sides of the gate, said guides being located at or near its central portion, and the opposite ends of the said cable are secured to the free end of the gate, preferably beneath that portion which is to engage with the keeper.

The gate is preferably provided with a spring controlled bolt 29, shown in detail in Fig. 4, adapted to enter the keeper 10 and hold the gate against accidental closing. This bolt is disengaged from the keeper simultaneously with opening the gate by attaching a wire 30 to the bolt, which wire is usually provided with a guide ring or loop 31 loosely mounted upon a standard of the gate, and at its opposite end the wire is passed through a guide upon the post 21 and then secured to the rear end of the rear member of the swing lever 24. Thus when the swing lever operates to move the gate it likewise draws the bolt inward.

In the operation of the gate, the gate being closed, it may be opened from either side of the fence by drawing downward upon the handle lever 15 at one side, or by pushing up the lever at the other side whereupon the swing lever will be swung upon its pivot, and at the same time the link or loop 26 connected with said lever will so draw upon the free end of the gate as to lift it from its keeper. The gate is then swung by the further manipulation of the lever to an open position, and will ride up the keeper 14 adapted to hold it in an open position, and pass to locking engagement with that keeper. The gate is closed in the same manner by manipulating the opposite handle lever, and should there be an obstruction, as for example a snow bank, in the path of the gate, it will while being drawn to an open or closed position readily ride up and pass over said obstruction, the peculiar pivoting of the gate and the location of the link or loop 26 permitting the gate to rise to the desired extent, and after the obstruction is passed the gate will, by its own gravity, drop to its proper position.

In fact, the lever 24 and the link or loop 26 may be considered one lever, or a lever in two parts, one part being pivoted to a fixed fulcrum and the other section or part having pivoted connection with the fixed section. A lever of this description and particularly the curving of the section 24, enables a person opening and shutting the gate to obtain a great purchase, as the curved section of the lever can never be pulled around far enough to be brought in a straight line with the link 25 connected with one of the actuating or handle levers.

Having thus described our invention, we claim as new and desire to secure by Letters Patent—

1. The combination, with a gate having pivotal and swinging support at the lower portion of one end only, a keeper upon which the opposite or free end of the gate normally rests, and handle or actuating levers located at opposite sides of the gate, pivoted to fixed supports, of a lever constructed in two sections, a curved section and a link or loop section, the two sections being pivotally connected, the said lever being pivoted to a fixed support through the medium of its curved section over the swing end of the gate, a connection between the opposing handle or actuating levers, and a link connection between one of said manipulating levers and one end of the curved section of the double lever, and a connection between the free end of the gate and the link or loop section of the double lever, as and for the purpose specified.

2. The combination, with a gate having pivotal and swinging support at the lower portion of one end only, a keeper upon which the opposite or free end of the gate normally rests, and actuating T-levers, pivoted to fixed supports at opposite sides of the gate, of a swing lever constructed in two sections, a curved body section and a link section, pivotally connected, the curved section being pivoted upon a fixed support over the pivot end of the gate, a truss connection between the actuating levers, a connection between one of said levers and the rear of the swing lever, a lift cable connecting the free end of the gate with the forward end of the swing lever, a bolt carried by the gate, and a cable connection between said bolt and the swing lever, substantially as shown and described.

3. The combination, with a gate having pivotal and swinging support at the lower portion of one end only, a keeper attached to a fixed upright and adapted normally to support the free end of the gate, and angular manipulating or handle levers pivoted to fixed supports located at opposite sides of the gate, said levers being connected with one another above and below their point of fulcrum; of a support located diagonally over the swing portion of the gate, and a double lever consisting of a curved section and a link or loop section pivotally connected therewith, the curved section of the lever being pivoted between the center and the forward end of the said support, a link connecting the lower portion of one of the manipulating or handle levers with the rear end of the curved section of the double lever, and a cable connected with the free end of the gate near the center thereof, which cable extends at opposite sides of the gate, being connected with its upper central portion and passed through the link or loop section of the double lever, as and for the purpose set forth.

JOHN F. FERRIS.
WARREN M. THOMAS.

Witnesses:
CHAS. MOHANNAH,
HENRY BOYD.